C. J. AXTELL.
ELECTRICAL SYSTEM OF POWER TRANSMISSION AND REGENERATIVE BRAKING.
APPLICATION FILED FEB. 4, 1918.
1,413,091.
Patented Apr. 18, 1922.
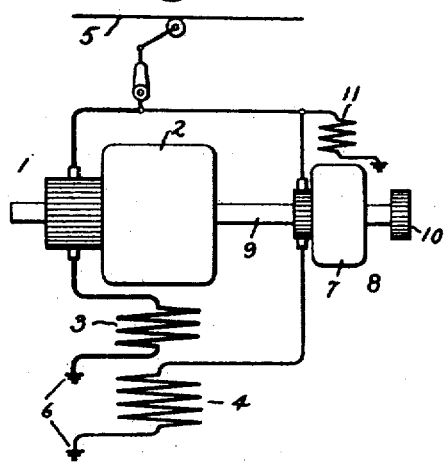
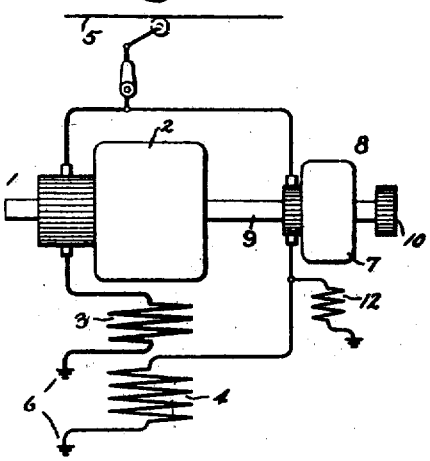
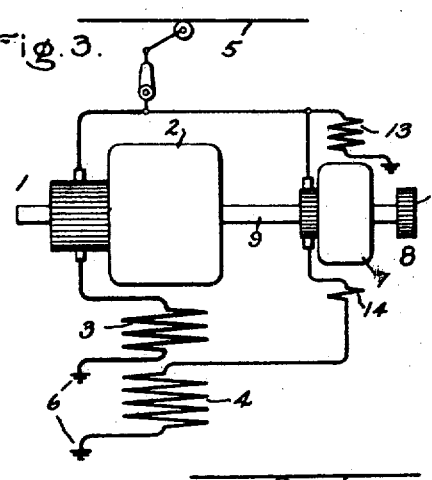
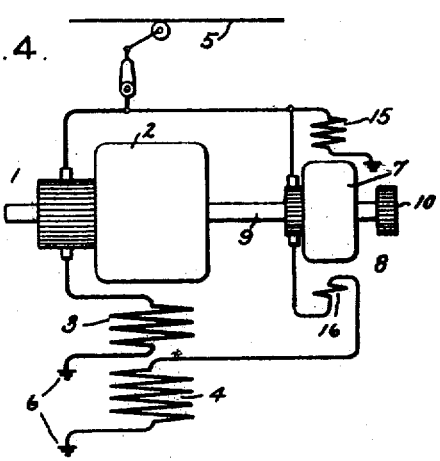
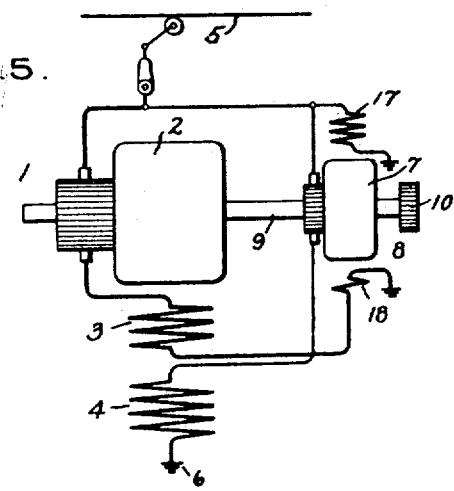
Inventor:
Clinton J. Axtell,
by *Robert G. Davis*
His Attorney.

UNITED STATES PATENT OFFICE.

CLINTON J. AXTELL, OF SCHENECTADY, NEW YORK, ASSIGNOR TO GENERAL ELECTRIC COMPANY, A CORPORATION OF NEW YORK.

ELECTRICAL SYSTEM OF POWER TRANSMISSION AND REGENERATIVE BRAKING.

1,413,091.      Specification of Letters Patent.      Patented Apr. 18, 1922.

Application filed February 4, 1918. Serial No. 215,278.

*To all whom it may concern:*

Be it known that I, CLINTON J. AXTELL, a citizen of the United States, residing at Schenectady, county of Schenectady, State of New York, have invented certain new and useful Improvements in Electrical Systems of Power Transmission and Regenerative Braking, of which the following is a specification.

My invention relates to electrical systems of power transmission and regenerative braking, and particularly to electrical systems of power transmission and regenerative braking comprising a main dynamo-electric machine, which is required to operate either as a motor to drive, or as a generator to brake, a load, such as a traction or similar load.

My invention has for its principal object the provision in systems of the kind referred to of means whereby, during the generator operation of the main dynamo-electric machine, the effect of variations in the speed of said machine upon the braking torque produced thereby may be partially, wholly or over compensated and the desired braking torque speed characteristic may be obtained. For different kinds of traction service different braking torque speed characteristics are desirable, and the requirements of a particular service may be for a characteristic according to which the braking torque remains approximately constant, or even increases as the speed decreases, or for a characteristic according to which the braking torque decreases as the speed decreases. My invention permits, by modification of the proportions and connections, of a wide choice in the braking torque speed characteristic of the dynamo-electric machine. My invention, furthermore, has for an object the provision of means whereby the dynamo-electric machine will be caused to operate during motoring with a speed torque characteristic similar to that of a series motor. Other objects of my invention will appear as this specification progresses.

In accordance with my invention, I provide the main dynamo-electric machine, or machines, with shunt and series field windings and provide speed responsive means, comprising a counter electromotive force machine, for varying the excitation of said shunt field winding inversely with variations in the speed of said dynamo-electric machine.

For a better understanding of my invention, reference should be made to the accompanying drawings, Fig. 1 of which illustrates diagrammatically a system embodying one modification of my invention; and Figs. 2, 3, 4 and 5 illustrate systems embodying other modifications of my invention.

Referring to the several figures of the drawing, in which similar reference characters designate similar parts, 1 represents a dynamo-electric machine having an armature 2, a series winding 3, and a shunt field winding 4. As illustrated the armature 2 is connected, in series with the series field winding 3, between the conductor 5 and ground 6. The conductor 5 and ground 6 constitute a variable voltage supply circuit. The relation of the windings 3 and 4 is such that the dynamo-electric machine 1 operates as a cumulative compound motor or as a differential compound generator. The shunt field winding 4 is connected in series with the armature 7, of the counter electromotive force dynamo-electric machine 8, hereinafter called the counter electromotive force machine, between the conductor 5 and ground 6. For the purpose of clearly indicating that the speed of the armature 7 varies with the speed of the armature 2, the armature 7 is illustrated as mechanically connected to the armature 2 by means of the shaft 9, which may also be connected to the axle of a vehicle or other load by means of the gear 10 and other mechanism not shown.

The counter electromotive force machine 8, as illustrated in Fig. 1, is provided with a field winding 11, connected between the conductor 5 and ground 6.

The counter electromotive force machine 8, as illustrated in Fig. 2, is provided with a field winding 12, which is in effect a series field winding, connected between a point, intermediate the armature 7 and the field winding 4, and ground 6.

The counter electromotive force machine 8, as illustrated in Fig. 3, is provided with a main field winding 13, connected between the conductor 5 and ground 6, and with a field winding 14, connected in series with the field winding 4 and the armature 7. The series field winding 14 is connected so that its magnetomotive force assists the magnetomotive force of the main field winding 13.

The counter electromotive force machine 8, as illustrated in Fig. 4, is provided with a main field winding 15, connected between the conductor 5 and ground 6, and with a field winding 16, connected in series with the field winding 4 and the armature 7. The series field winding 16 is connected so that its magnetomotive force opposes the magnetomotive force of the main field winding 15.

The counter electromotive force machine 8, as illustrated in Fig. 5, is provided with a main field winding 17, connected between the conductor 5 and ground 6, and with a series field winding 18, connected in series with the series field winding 3 and the armature 2 of the main dynamo-electric machine 1. The field winding 18 is connected so that its magnetomotive force opposes the magnetomotive force of the field winding 17, when the dynamo-electric machine 1 operates as a motor, and assists the magnetomotive force of the field winding 17, when the dynamo-electric machine 1 operates as a generator.

While the field windings 11, 13, 15 and 17 in Figs. 1, 3, 4 and 5 respectively are shown as connected to the supply circuit comprising conductor 5 and ground 6, they may be energized from any other source of current whose voltage does not vary too greatly.

The operation of my invention as embodied in the system illustrated in Fig. 1, as at present understood, is as follows:

First assume the dynamo-electric machine 1 to be operating as a cumulative compound motor at a certain relatively low speed. A relatively heavy current will, therefore, traverse the armature 2 and the series field winding 3. A relatively heavy current will also traverse the shunt field winding 4 since, by reason of the low speed at which the armature 7 is being driven, the counter electromotive force developed therein, which opposes the flow of current through the field winding 4, will be relatively low. If, for any reason, the speed of the dynamo-electric machine 1 increase the current traversing the field winding 3 will decrease due to the increase in the counter electromotive force developed in the armature 2 and the current traversing the field winding 4 will decrease due to the increase in the counter electromotive force developed in the armature 7. For similar reasons a decrease in the speed of the dynamo-electric machine 1 will result in an increase in the current traversing the field winding 3 and the field winding 4. It will thus be evident that, during the motor operation of the dynamo-electric machine 1, the current in the shunt field winding 4, as well as the current in the series field winding 3, varies inversely with the speed of the dynamo-electric machine 1 and that the dynamo-electric machine 1 will operate with a torque speed characteristic similar to that of a series motor. The series field winding 3 furthermore acts to prevent objectionable rushes of current, such as would occur if it were not used, upon a sudden increase in the supply circuit voltage.

Now assume the dynamo-electric machine 1 to be operating as a differential compound generator at a certain relatively high speed and to be returning power to the supply circuit. The counter electromotive force developed in the armature 7 will then be relatively high and hence the current traversing the shunt field winding 4 will be relatively low. For a certain supply circuit voltage the dynamo-electric machine 1 will, under these conditions, supply a certain amount of current to the supply circuit and will exert a certain braking torque upon the vehicle, or other load, by which it is driven. If now the speed of the dynamo-electric machine 1 decrease, the counter electromotive force developed in the armature 7 will be diminished and the current traversing the shunt field winding 4 will be increased, thereby tending to compensate for the effect of the decreased speed upon the voltage generated in the armature 2, the current returned to the supply circuit, and the braking torque. For similar reasons an increase in the speed of the dynamo-electric machine will result in a decrease in the current traversing the field winding 4. It is thus evident that, during the generator operation of the dynamo-electric machine 1, the current in the shunt field winding 4 will vary inversely with the speed of the dynamo-electric machine and that the minimum speed at which the dynamo-electric machine will return power to the supply circuit is materially lowered. The series field winding 3 by reason of its differential action prevents objectionable rushes of current, such as would occur if it were not used, upon a sudden decrease in the supply circuit voltage.

The operation of the system illustrated in Fig. 2 is substantially the same as the operation of the system illustrated in Fig. 1. The relation between the counter electromotive force developed in the armature 7 and the speed thereof is different however, because the exciting winding 12 is connected, across the field winding 4 and is in effect a series field winding.

The operation of the systems illustrated in Figs. 3 and 4 is substantially the same as the operation of the system illustrated in Fig. 1. The relation between the counter electromotive force developed in the armature 7 and the speed thereof is different, however, because of the use of the cumulative series field winding 14 in the system illustrated in Fig. 3 and the use of the differential series field winding 16 in the system illustrated in Fig. 4.

The operation of the system illustrated in Fig. 5 is substantially the same as the operation of the system illustrated in Fig. 1. The relation between the counter electromotive force developed in the armature 7 and the speed thereof is different, however, because of the use of the series field winding 18 which is connected in series with the armature 2 and the series field winding 3 of the dynamo-electric machine 1. The field winding 18 acts differentially with respect to the main field winding 17, during the motor operation, and cumulatively with respect to the field winding 17, during the generator operation of the dynamo-electric machine 1. If, during the motor operation of the dynamo-electric machine 1, the voltage of the supply circuit increase, the current in the field winding 18 will increase and, due to the increased differential action thereof, the counter electromotive force developed in the armature 7 will decrease, thereby increasing the current in the field winding 4. If, during the generator operation of the dynamo-electric machine 1, the voltage of the supply circuit decrease, the current in the field winding 18 will increase. Due to the increased cumulative action of the field winding 18, the counter electromotive force developed in the armature 7 will increase thereby decreasing the current in the field winding 4. The field winding 18, therefore, tends to cause a variation in the current in the field winding 4, upon fluctuation in the supply circuit voltage, in a direction to prevent objectionable rushes of current.

By selection of the proper connections and of the proper proportions the dynamo-electric machine 1 may be made to have, during its motor operation, a speed torque characteristic similar to that of a series motor and to have, during its generator operation, speed torque characteristics according to which the torque remains approximately constant, decreases, or increases as its speed decreases.

While my invention is illustrated as embodied in systems having but one main dynamo-electric machine, it is manifest that it may be applied to systems having a plurality of main dynamo-electric machines and that the shunt field windings of several machines may be connected in series with each other and with the armature of a single counter electromotive force machine across the supply circuit or that independent counter electromotive force machines may be employed for each main dynamo-electric machine.

I conceive that various modifications of my invention may be made and I accordingly do not desire to be limited to the exact arrangements shown, but seek to cover in the appended claims all such modifications and arrangements as fall within the scope and spirit of my invention.

What I claim as new and desire to secure by Letters Patent of the United States, is,—

1. The combination with a supply circuit, of a direct current generator, provided with shunt and series field windings and connected to the supply circuit to deliver energy thereto, of means for varying the excitation of said shunt field winding inversely with variations in the speed of said generator, comprising a counter electromotive force machine connected to be driven at a speed responsive to the speed of the generator and having a field energized responsively to the voltage of the supply circuit.

2. The combination with a supply circuit, of a dynamo-electric machine, provided with shunt and series field windings and connected to operate as a differential compound generator to deliver energy to the supply circuit, and a counter electromotive force machine connected to be driven at speeds varying with the speed of said dynamo-electric machine and provided with field winding which is varied in accordance with the potential of the supply circuit and an armature connected in series with said shunt field winding during the generator operation of said dynamo-electric machine.

3. The combination with a supply circuit, of a load, a dynamo-electric machine, provided with series and shunt field windings and connected to the supply circuit to operate either as a motor to drive said load or as a generator to brake said load by returning energy to the supply circuit, and speed responsive means, comprising a counter electromotive force machine having a field winding energized responsively to the voltage of the supply circuit, operable during both the motor and generator operation of said dynamo-electric machine for varying the excitation of the shunt field winding inversely with variations in the speed of said dynamo-electric machine.

4. The combination with a supply circuit, of a load, a dynamo-electric machine, provided with series and shunt field windings and connected to the supply circuit to operate either as a cumulative compound motor to drive said load or as a differential compound generator to brake said load, and a counter electromotive force machine connected to be driven at speeds varying with the speed of said dynamo-electric machine, the said counter electromotive force machine being provided with an armature connected in series with said shunt field winding and a field energized responsively to the voltage of the supply circuit.

5. The combination with a variable voltage supply circuit, of a load, a dynamo-electric machine, provided with series and shunt field windings and connected to the supply circuit either to be operated as a cumulative compound motor by power supplied from said circuit to drive said load or to be operated as a differential compound generator by said load to return power to said circuit, and a counter electromotive force machine connected to be driven at speeds varying with the speed of said dynamo-electric machine and provided with an armature connected in series with said shunt field winding and a shunt field connected to the supply circuit.

6. The combination with a variable voltage supply circuit, of a load, a dynamo-electric machine, provided with series and shunt field windings and connected either to be operated as a cumulative compound motor by power supplied from said circuit to drive said load or to be operated as a differential compound generator by said load to return power to said circuit, and a counter electromotive force machine connected to be driven at speeds varying with the speed of said dynamo-electric machine and provided with a shunt field, an armature connected in series with the shunt field winding of said dynamo electric machine, and a series field winding.

7. The combination with a variable voltage supply circuit, of a load, a dynamo-electric machine, provided with series and shunt field windings and connected either to be operated as a cumulative compound motor by power supplied from said circuit to drive said load or to be operated as a differential compound generator by said load to return power to said circuit, and a counter electromotive force machine connected to be driven at speeds varying with the speed of said dynamo-electric machine and provided with an armature, connected in series with said shunt field winding, a main field winding energized responsively to the voltage of the supply circuit and a series field winding.

8. The combination with a variable voltage supply circuit, of a load, a dynamo-electric machine, provided with series and shunt field windings and connected either to be operated as a cumulative compound motor by power supplied from said circuit to drive said load or to be operated as a differential compound generator by said load to return power to said circuit, and a counter electromotive force machine connected to be driven at speeds varying with the speed of said dynamo-electric machine and provided with an armature, connected in series with said shunt field winding, a main field winding, connected to said supply circuit, and a field winding, connected in series with the armature of said dynamo-electric machine.

9. The combination with a motor having a magnetic field circuit and a field winding for inducing a flux in said magnetic field circuit, of a regulating dynamo connected in series with said field winding to form a field winding circuit, means for impressing a substantially constant potential on said field winding circuit, a field winding for said regulating dynamo, means for supplying current to said regulating dynamo field winding at a rate constantly proportional to the flow of current in said motor field winding, means for causing said motor and dynamo to rotate at speeds bearing a constant ratio to each other, and other means forming a part of said motor and responsive to increase in load for increasing the flux in said magnetic field circuit for reducing the speed of said motor.

In witness whereof, I have hereunto set my hand this 31st day of January, 1918.

CLINTON J. AXTELL.